United States Patent [19]

Jones, Jr. et al.

[11] Patent Number: 4,753,095
[45] Date of Patent: Jun. 28, 1988

[54] METHOD FOR DETERMINING REAL GAS EFFECTS IN CRITICAL FLOW NOZZLES

[75] Inventors: Emrys H. Jones, Jr., Yorba Linda, Calif.; Robert E. Jackson, Coraopolis, Pa.

[73] Assignee: Chevron Research Company, San Francisco, Calif.

[21] Appl. No.: 65,195

[22] Filed: Jun. 22, 1987

Related U.S. Application Data

[62] Division of Ser. No. 874,731, Jun. 16, 1986, Pat. No. 4,706,492.

[51] Int. Cl.$^4$ .............................................. G01F 25/00
[52] U.S. Cl. .............................................. 73/196; 73/3
[58] Field of Search ........................... 73/3, 196, 861.61

[56] References Cited

U.S. PATENT DOCUMENTS

| | | | |
|---|---|---|---|
| 3,469,442 | 9/1969 | Brueckner | 73/3 X |
| 3,604,254 | 9/1971 | Sabuda | 73/3 X |
| 3,741,009 | 6/1973 | Bordeaux | 73/3 X |
| 3,750,472 | 8/1973 | Ducousset | 73/3 X |
| 4,027,523 | 6/1977 | St. Clair | 73/3 |
| 4,122,707 | 10/1978 | Leunig | 73/118.1 |
| 4,590,790 | 5/1986 | Hicks et al. | 73/3 |
| 4,674,316 | 6/1987 | Albrecht et al. | 73/3 |
| 4,706,492 | 11/1987 | Jones, Jr. et al. | 73/3 |

OTHER PUBLICATIONS

Technology Section *Oil and Gas Journal;* Emrys H. Jones Jr. et al.; "Chevron Facility Focused on Commercial Orifice-Meter Research"; pp. 60-63, Jul. 27, 1987 Edition and Research Yields Precise Uncertainty Equations; the concluding portion on pp. 39-43 of the Aug. 3, 1987 Edition.

*Primary Examiner*—Tom Noland
*Attorney, Agent, or Firm*—S. R. La Paglia; E. J. Keeling; E. A. Schaal

[57] ABSTRACT

A method and apparatus for determining the gas flow rate in a high pressure critical flow nozzle is disclosed. A high pressure gas flows through a first critical flow nozzle. Upstream of the first critical flow nozzle a small slip-stream of gas is removed and flows through a smaller second critical flow nozzle. The small second critical flow nozzle drops the pressure of the gas to a low level. This flow rate of this low pressure gas stream is measured in a highly accurate low pressure gas flow rate measuring device. Since the flow rate in this device must be the same as that of the second critical flow nozzle, a correction factor can be calculated for the second critical flow nozzle. This flow rate correction factor will be the same for the first critical flow nozzle.

3 Claims, 2 Drawing Sheets

METHOD FOR DETERMINING REAL GAS EFFECTS IN CRITICAL FLOW NOZZLES

This is a division of application Ser. No. 874,731, filed June 16, 1986, now U.S. Pat. No. 4,706,492.

BACKGROUND OF THE INVENTION

This invention pertains in general to a method and means for accurately determining the flow rate of gas through a pipe. More specifically, the present invention describes a method and apparatus for determining to a high degree of accuracy the flow rate of high pressure natural gas through a pipeline by means of critical flow nozzles.

In the purchase and sale of natural gas, extremely large volumes of natural gas are continuously purchased and sold. Sales meters are installed in the gas lines to measure the volume of gas passed through the line and, thus, determine the amount of money which must be paid for the gas. Because tremendous volumes of gas are being purchased and sold, errors of only a few tenths of a percent in the meters can result in million of dollars in over or under payment over a long period of time.

In order to calibrate these sales meters, a "critical flow nozzle" can be used in series with the sales meter for a short period of time, i.e., a nozzle in which the gas reaches supersonic speeds in the nozzle. As is well known to one skilled in the art, the gas flow rate through a critical flow nozzle is dependent only on the pressure and temperature upstream of the nozzle and the thermodynamic properties of the gas. Using equations well known to one skilled in the art, the gas flow rate through a critical flow nozzle can, therefore, be easily determined. A gas meter in series with a critical flow nozzle can, therefore, be easily calibrated.

The equations for the flow rate through a critical flow nozzle for some gas mixtures are highly accurate. However, some gas mixtures do not have an accurate equation of state. At extremely low pressures, the ideal gas law is an adequate equation of state. Various equations are known which account for the increased molecular interactions occurring at higher pressures. At very high pressures, even the most sophisticated of these equations become somewhat questionable. Further, when a complex mixture of gases (such as natural gas) is being measured, these equations become increasingly unreliable. These problems are further complicated when highly polar molecules are present, such as $CO_2$ and $H_2S$. As petroleum reserves are depleted, natural gases containing higher percentages of these components are being produced.

BRIEF DESCRIPTION OF THE INVENTION

Accordingly, the present invention provides a method and means for providing a highly accurate determination of the gas flow rate through a critical flow nozzle in a high pressure gas pipeline by providing a highly accurate correction factor to the equation of state. A small slipstream of gas is removed upstream of the primary critical flow nozzle. This slipstream of gas flows through a first critical flow nozzle sized to reduce the gas pressure to a very low level. The slipstream of gas then flows through a second flow measuring device (which may be an orifice plate, another critical flow nozzle or another type of flow measurement device). Since the gas stream is now at low pressure, the flow rate can be readily determined because a low pressure equation of state can be used.

Since the mass flow rate in the first slipstream critical flow nozzle must be the same as that of the downstream measurement device, a "correction factor" can be determined for the upstream critical flow meter to correct the well-known critical flow nozzle equation for real gas effects. This correction will be the same for the critical flow nozzle that is used for calibration of the sales gas meter since the gas composition and the upstream pressure and temperatures are the same for both the primary and the slipstream nozzles.

DESCRIPTION OF THE PREFERRED EMBODIMENT

Figure 1:
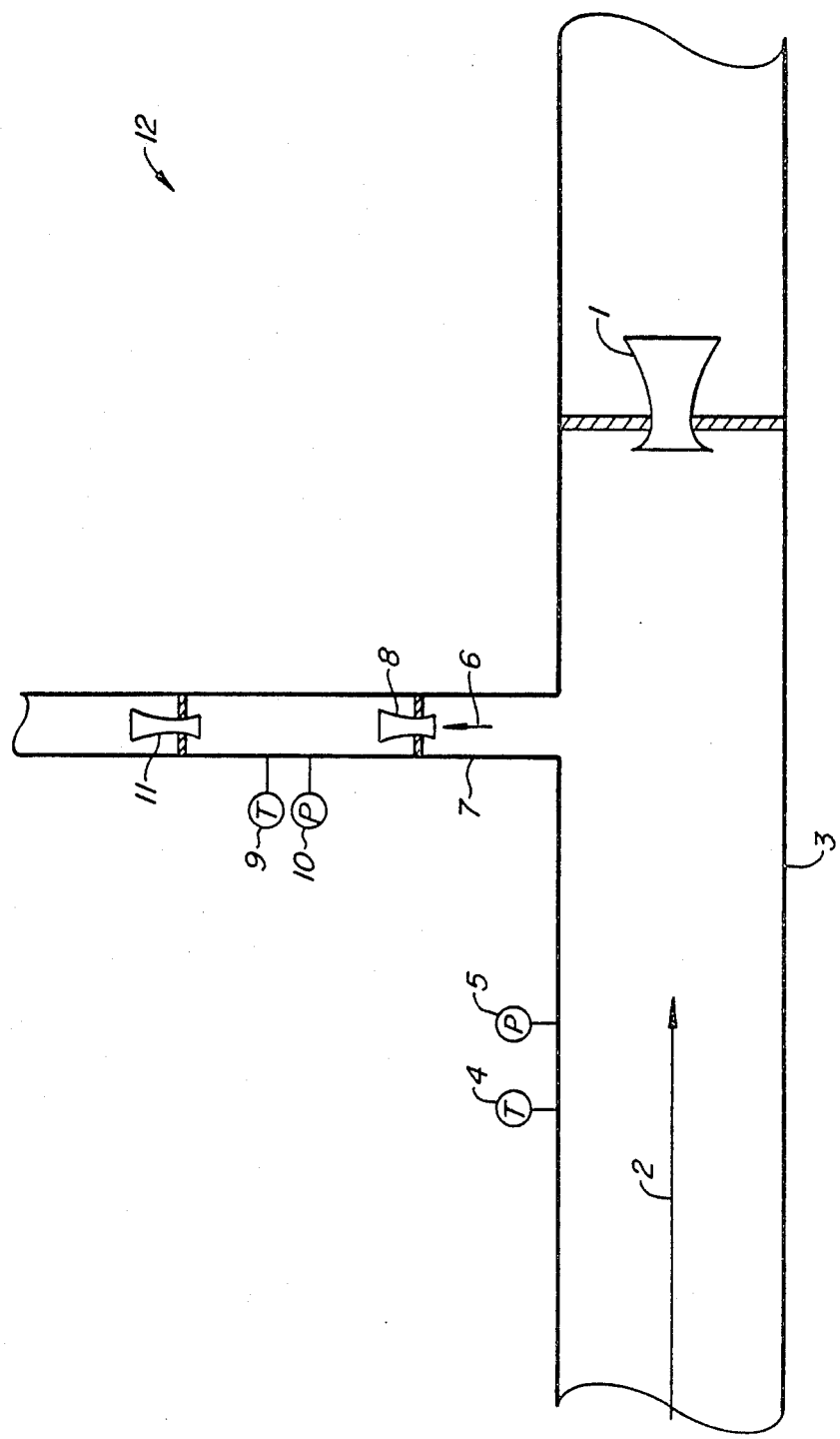
FIG. 1 is a diagrammatic partial cross-section of the apparatus used according to the present invention.

As illustrated in FIG. 1, the apparatus for determining real gas effects 12 includes a first critical flow nozzle 1 that is used to measure the rate at which natural gas 2 is flowing through a pipeline 3. The temperature and pressure of the gas are measured with an upstream temperature measuring device 4 and an upstream pressure measuring device 5.

A slipstream of gas 6 flows through a branch line 7 and than through a second critical flow nozzle 8. The second critical flow nozzle 8 is sized such that the downstream pressure will be relatively low (e.g., less than 100 pounds per square inch absolute, but preferably around 20 psia). Downstream of the second critical flow nozzle, a midstream temperature measuring device 9 and a midstream pressure measuring device 10 measure the temperature and pressure of the gas. The slipstream of gas 6 then flows through a low pressure gas flow rate measurement device 11. In the preferred embodiment, this device is another critical flow nozzle, although it may be another type of flow measurement device, such as an orifice plate equipped with a differential pressure indicator, a venturi meter, a Bell prover, etc. This meter should, however, have accuracy equal to or greater than the desired accuracy of the primary nozzle.

After passing through the low pressure metering device, the gas flows to the atmosphere, to a vapor recovery system or to another low pressure sink.

The dimensions of the various pieces of equipment will vary from situation to situation, but can easily be determined by one skilled in the art. The size and shape of the critical flow nozzles will depend upon several factors, including the line size, the gas pressures, the gas temperature, and approximate flow rate. Standards for the sizes and shapes of the nozzles are well known in the art. Adequate distances should also be allowed between any upstream obstructions and the various critical flow nozzles and pressure measurement devices to prevent disturbance effects. Again, these distances would be different for each design, but can be easily determined by one skilled in the art.

Figure 2:
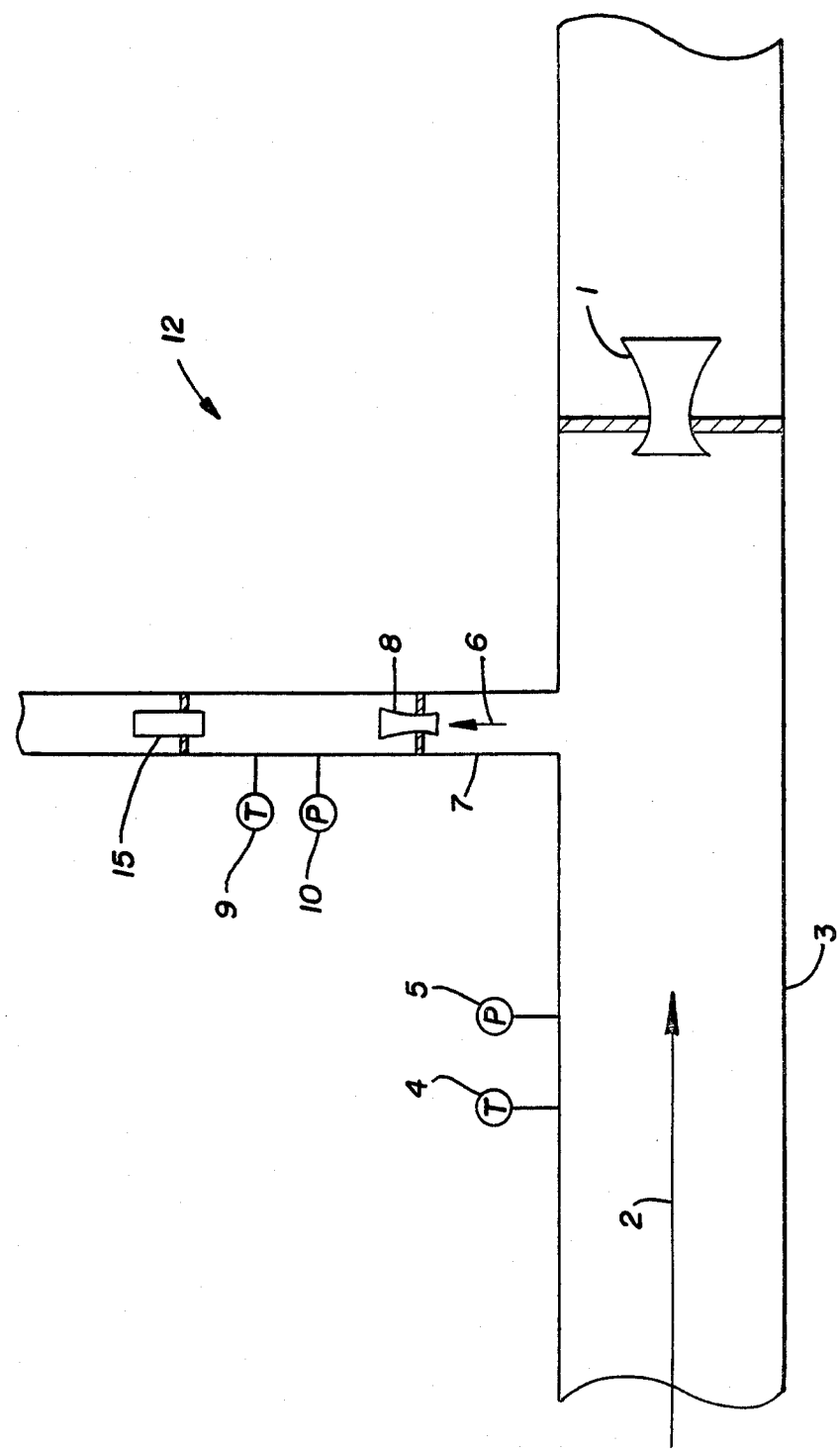
FIG. 2 is a diagrammic partial cross-section of one embodiment of the apparatus used according to the present invention.

Since the low pressure critical flow nozzle 11 is operating at nearly atmospheric pressure, the flow rate through this nozzles can be accurately determined using readily available, ideal computation methods when the midstream pressure and temperature and gas composition are known, along with the nozzles' physical characteristics. The gas composition can also be readily determined by analytical methods readily known to one skilled in the art. As shown in FIG. 2, in one embodiment, the low pressure gas measuring means can be an accurate low volume meter prover 15.

In the preferred embodiment, the program described by R. C. Johnson ("Tables of Critical Flow Functions and Thermodynamic Properties for Methane and Computational Procedures for Both Methane and Natural Gas", *NASA Special Report,* NASASP-3074) is used to calculate the flow rate through the first critical flow nozzle 1 and the second flow nozzle 8 and the low pressure critical flow nozzle 11. Since the upstream pressure for the first critical flow nozzle and the second critical flow nozzle is extremely high and components may be present in the gas which are not well characterized at high pressure, it is likely that there will be significant errors in the flow rate calculation from these meters. However, it is known that the mass flow rate of gas through the second critical flow nozzle must be the same as that through the low pressure measurement device. Therefore, let:

$$M_2 = M = M_{2c} C_{RG}$$

where:
$M$ = Actual flow through the low pressure meter 11.
$M_{2c}$ = Calculated flow through the second critical flow nozzle 8.
$C_{RG}$ = Real Gas coefficient.
$M_2$ = Actual mass flow through the second critical flow meter.

Rearranging:

$$C_{RG} = M/M_{2c}$$

Since the first critical flow nozzle 1 operates at the same upstream pressure and temperature as the second critical flow, nozzle 8, the actual flow rate through the first critical flow nozzle 1 can be calculated using the same real gas coefficient, i.e.:

$$M_1 = C_{RG} M_{1c} = \frac{M}{M_{2c}} M_{1c}$$

where:
$M_1$ = Actual mass flow through the first critical flow nozzle 1.
$M_{1c}$ = Calculated flow through the first critical flow nozzle 1.

Of course, the mass flow rate entering the calibration apparatus 2 will simply be the sum of the mass flow rates through the first critical flow nozzle and the low pressure measurement device 11, i.e.:

$$M_T = M_1 + M$$

where:
$M_T$ = the total mass flow rate of gas entering the apparatus.

While the present invention has been described in terms of a preferred embodiment, further modifications and improvements will occur to one skilled in the art. It is to be understood, therefore, that the invention is not limited to the above-discussed embodiment but to the appended claims.

What is claimed is:
1. A method of determining the gas flow rate in a high pressure gas line comprising:
   removing a slipstream from a main gas stream in a flowing gas line, leaving a residual main gas stream;
   flowing said residual main gas stream through a first critical flow nozzle;
   flowing said slipstream through a second critical flow nozzle to produce a low pressure slipstream;
   flowing said low pressure slipstream through a gas flow rate measurement means;
   measuring a gas line pressure with a first pressure measurement means;
   measuring a gas line temperature with a first temperature measurement means;
   determining a gas composition of said main gas stream;
   measuring a low pressure slipstream pressure with a second pressure measuring means;
   measuring a low pressure slipstream temperature with a second temperature measuring means;
   calculating an actual slipstream flow rate as a function of said low pressure slipstream temperature, said low pressure slipstream pressure, and said gas composition;
   calculating a calculated slipstream flow rate as a function of said gas line pressure, said gas line temperature, and said gas composition;
   calculating a calculated residual main gas stream flow rate as a function of said gas composition, said gas line, and said gas line pressure;
   calculating a real gas correction factor with the following equation:

$$C_{RG} = \frac{M}{M_2}$$

where:
   $C_{RG}$ = said real gas correction factor,
   $M$ = said actual slipstream flow rate, and
   $M_2$ = said calculated slipstream flow rate;
   calculating an actual residual main gas stream flow rate with the following equation:

$$M_1 = C_{RG} M_{1c}$$

where:
   $M_{1c}$ = said calculated residual main gas stream flow rate and
   $M_1$ = said actual residual main gas stream flow rate;
   calculating a main gas stream flow rate with the following equation:

$$M_T = M_1 + M$$

where: $M_T$ = said main gas stream flow rate.
2. The method as recited in claim 1 wherein said actual slipstream flow rate is measured with a third critical flow nozzle.
3. The method as recited in claim 1 wherein said actual slipstream flow rate is measured with a meter prover.

* * * * *